July 15, 1952 D. E. ERICSON ET AL 2,603,581
TIRE BUILDING DRUM
Filed Dec. 13, 1949 3 Sheets-Sheet 1
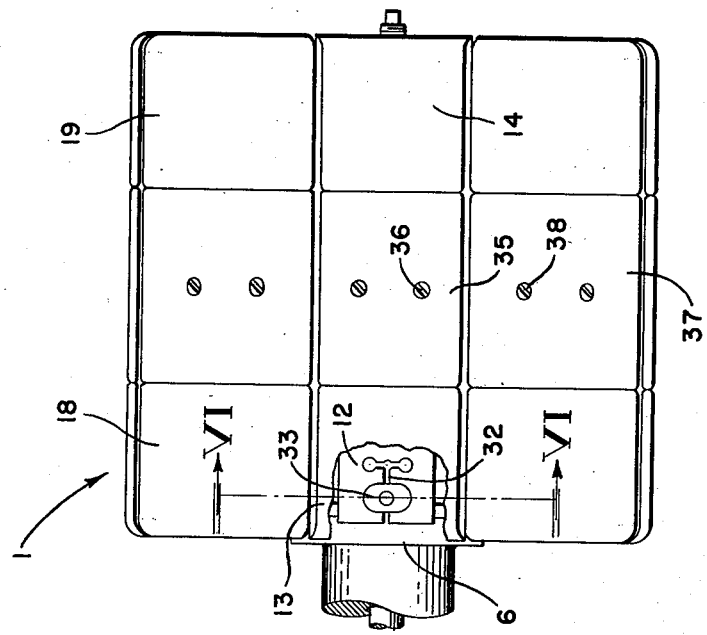
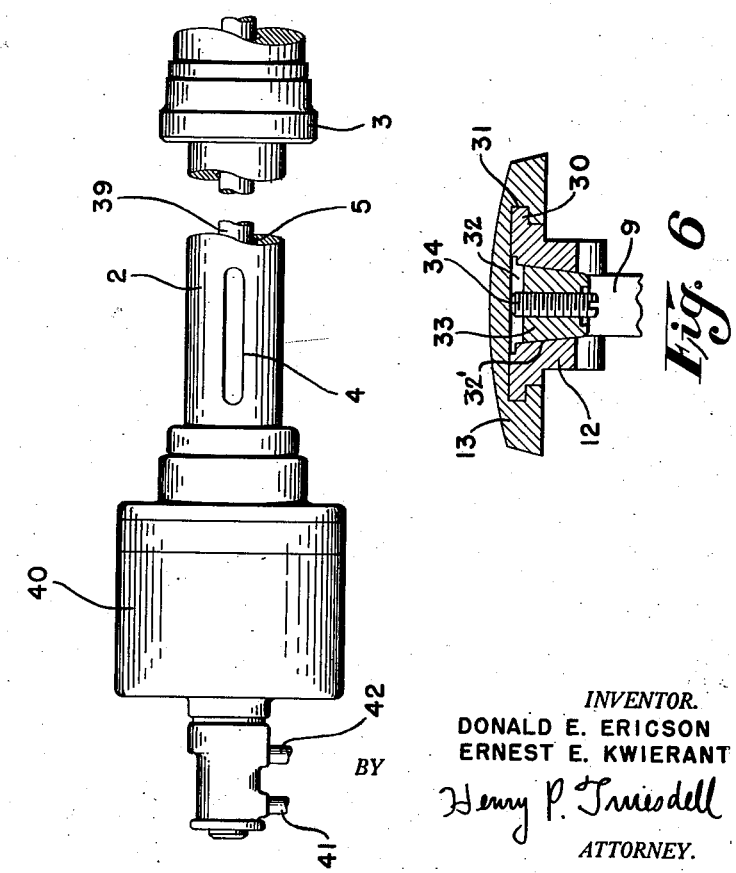
INVENTOR.
DONALD E. ERICSON
ERNEST E. KWIERANT
BY Henry P. Truesdell
ATTORNEY.

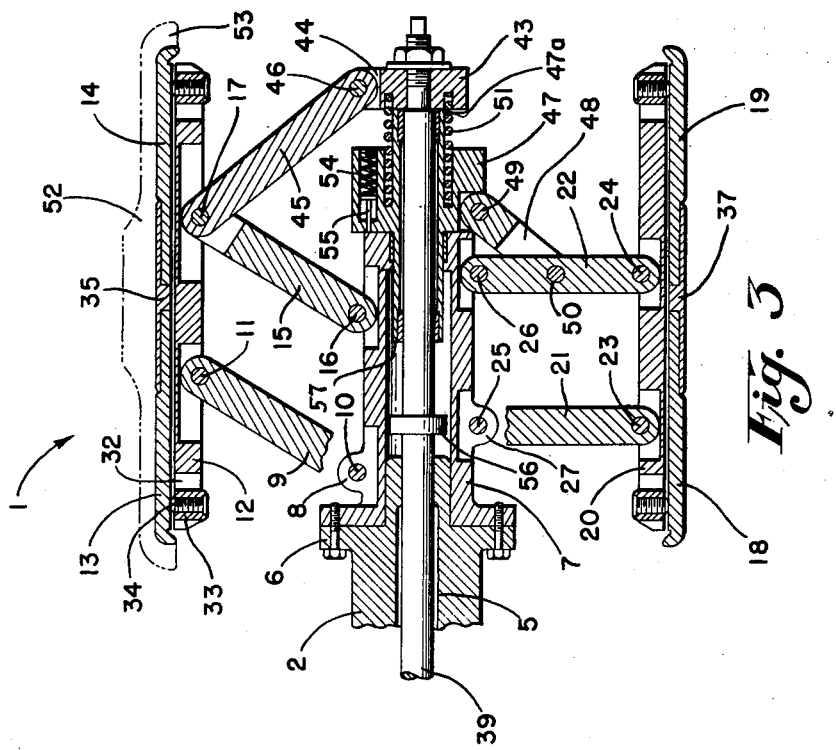
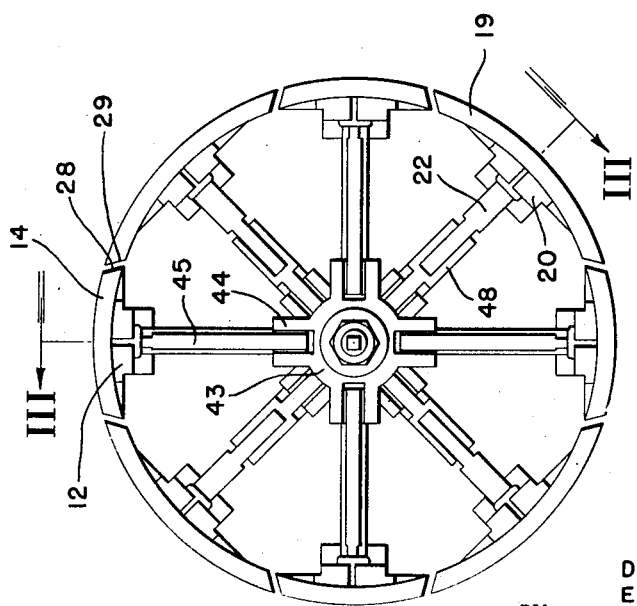

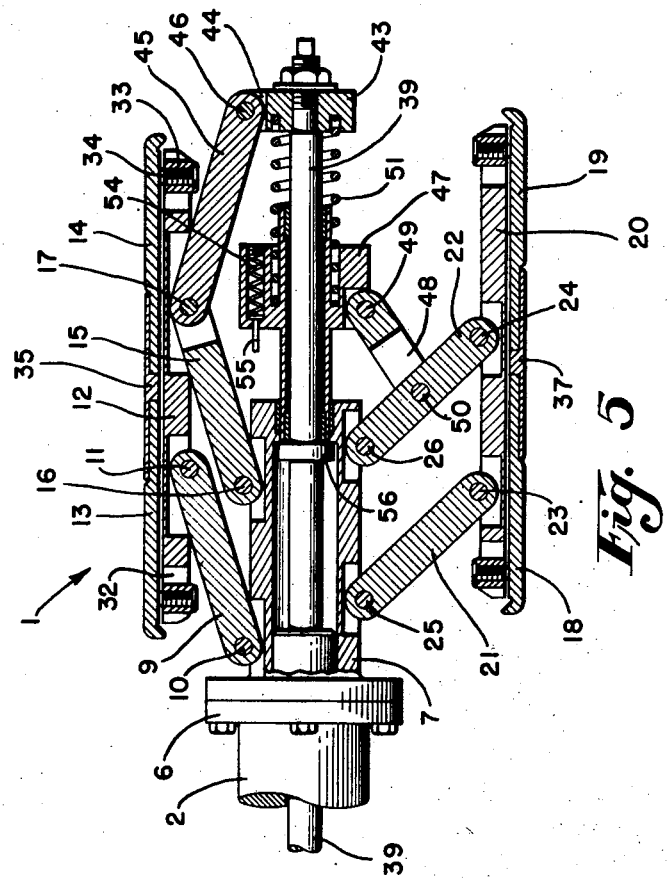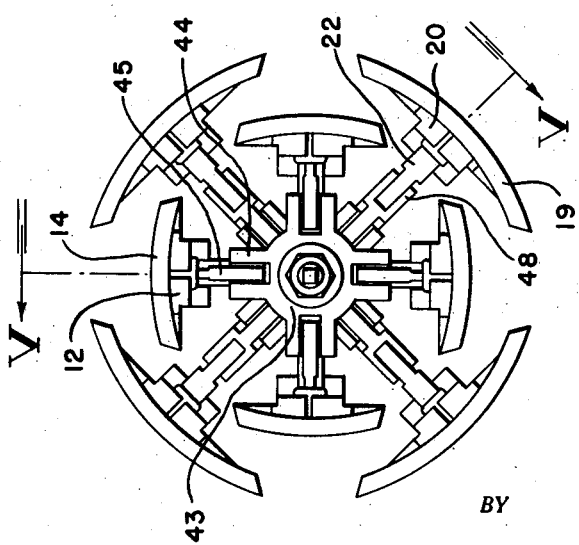

Patented July 15, 1952

2,603,581

UNITED STATES PATENT OFFICE 2,603,581

TIRE BUILDING DRUM

Donald E. Ericson, Detroit, and Ernest E. Kwierant, Van Dyke, Mich., assignors to United States Rubber Company, New York, N. Y., a corporation of New Jersey Application December 13, 1949, Serial No. 132,704

9 Claims. (Cl. 154—9)

This invention relates to tire building drums and, in particular, it relates to a segment type of drum in which the segments are collapsible so that the tires may be removed therefrom.

In the manufacture of pneumatic tires according to the so-called flat band method, a tire is built up on a drum with the tire bead portions extending over the edges of the drum. In order to remove a tire which has been built on the drum, it is necessary to collapse the drum in such a manner that movement of the drum segments will be maintained in a uniform transaxial plane until the drum segments are able to clear the radially inward extending bead portions.

In accordance with the practice of our invention, we have provided a novel arrangement of a tire building drum in which drum segments are movable both axially and radially of the drum, in combination with a uniform axial movement of the drum segments followed by an alternate irregular movement of drum segments. The object of this arrangement is to make it possible to collapse drum segments by an ordinary lever arrangement, and to maintain uniform axial movement of the drum segments while the drum is in engagement with the bead portions of a tire. As soon as the drum segments become disengaged with the bead portions of a tire, the segments alternately assume different axial positions, the result of which effectively accomplishes the collapsing operation.

It is, therefore, among the objects and advantages of our invention to provide a collapsible tire building drum which will operate by direct axial movement acting upon a simple lever arrangement; to provide such a collapsible drum in which the segments move uniformly for a predetermined axial distance and thereafter assume different alternate positions relative to the axis of the drum; to provide a collapsible type of tire building drum which is positively actuated by means of a central movable shaft; and to provide such a drum which operates efficiently and which may be manufactured economically. These and other objects and advantages will appear more fully in the following detailed description when considered in connection with the accompanying drawings, in which:

Figure 1 is a side elevational view partly broken away illustrating a tire building drum forming an embodiment of our invention;

Figure 2 is an end elevational view of the drum shown in expanded position;

Figure 3 is a transverse view, in section, of the drum taken along lines III—III of Figure 2;

Figure 4 is an end elevational view of the drum illustrated in its collapsed position;

Figure 5 is a transverse view, in section, of the collapsed drum taken along lines V—V of Figure 4; and Figure 6 is a detailed and enlarged view, in section, of a drum segment and attaching means taken along lines VI—VI of Figure 1.

With reference to the drawings and, in particular, to Figure 1, we show an embodiment of our invention in the form of a collapsible tire building drum 1 supported by a drive shaft 2. In accordance with conventional practice, the drive shaft 2 is, in turn, supported by a stand (not shown) which includes bearings, motor, drive, etc. The enlarged portion 3 on the shaft 2 is for cooperation with a bearing, and a keyway 4 enables means to be attached thereto for the purpose of driving the shaft 2. A bore 5 extends through the shaft 2. The drum 1 in extended position is shown, in particular, in Figures 2 and 3. The end of the shaft 2 includes a flange 6 and to this flange is bolted a hub 7. Extending from the hub are a plurality of lugs 8, to each one of which an arm 9 is pivotally attached by means of a pin 10. The other end of each arm 9 pivotally connects by means of a pin 11 to a base plate 12 to which segment portions 13 and 14 are slidably attached. A second arm 15 is pivotally attached to the hub 7 by means of a pin 16 and is also attached to the base plate 12 by another pin 17. By this arrangement, the arms 9 and 15 operate in parallel relationship to maintain the base plate 12 in parallel relation with the axis of the drum. A plurality of the segments 13—14 extend around the drum in an alternate position with other segments hereinafter described. In the present illustration there are four composite segments 13—14.

Interposed between each of the composite segments 13—14 is a pair of larger segment portions 18 and 19. These segments 18 and 19 are slidably attached to a base plate 20 which is almost identical to the base plate 12 which supports the alternate segments 13 and 14. A pair of arms 21 and 22 connect with the base plate 20 by means of pins 23 and 24, respectively. The opposite ends of the arms 21 and 22 are pivotally joined by means of pins 25 and 26, respectively, to lugs 27 extending from the hub 7. It will be noted that the lugs 8 and the lugs 27 are axially offset relative to each other along the length of the hub 7. The reason for this is that there is insufficient room for all of the lugs to be positioned in a uniform transaxial plane.

The segments 13 and 14 assume a collapsed position prior to the segments 18 and 19. Therefore, the side edge 28, as in the segment 14 (Figure 2), is tapered to permit a closer relationship with its adjoining segment 19 having an oppositely tapered side edge 29.

The method of attaching the segments such as 13 and 14 with the base plate 12 is shown, in particular, in Figures 1 and 6. The base plate 12 includes a longitudinally extending track member 30, and the segment 13 includes a corresponding slot 31 for accommodating the track 30. The segment 13 is, therefore, slidable along the track in a longitudinal manner so as to provide an adjustment increasing the length of the drum 1.

In order to lock the segment 13 with the base plate 12, we provide therein a slot 32 which has tapered sides 32' as shown in Fig. 6. The slot allows a small amount of expansion of the base plate when pressure is applied to the tapered sides of the slot. Positioned within the slot 32 is a correspondingly tapered sleeve 33 having a set screw 34 extending therethrough. By turning the set screw 34 into the tapered sleeve 33, the set screw strikes the segment 13 and moves the tapered sleeve 33 downward in the slot 32, resulting in an outward expansion of the base plate 12 thereby causing a locking engagement between the base plate 12 and the segment 13. Each of the segments 13, 14, 18 and 19 is provided with a similar arrangement for locking the segments with the base plate.

When the segments 13 and 14 are separated to provide widthwise adjustment, a shield 35 serves as a cover for closing any gap between the segments 13 and 14. The shield 35 is attached directly to the base plate 12 by means of machine screws 36 (Fig. 1). In a similar manner, a shield 37 serves to close the gap between the segments 18 and 19. The shield 37 is likewise attached to the base plate 20 by means of machine screws 38.

Extending axially of the shaft 2 and within the bore 5 thereof is a rod 39 capable of reciprocal movement within the shaft 2. In order to produce the reciprocal movement, we provide a conventional type of double actuating fluid operable cylinder 40. This cylinder includes inlet and outlet conduits 41 and 42 through which fluid pressure is conducted. An example of a fluid operable cylinder of this type is shown in a patent to Olson, No. 1,544,679, dated July 7, 1925.

The rod 39 attaches to a piston in the cylinder 40 and the rod extends throughout the length of the shaft 2 and hub 7. The end of the rod 39 extends beyond the hub 7 and is fastened to a block 43. This block includes lugs 44 to each one of which is pivotally attached an arm or link 45 by means of a pin 46. This opposite end of this arm or link 45 is pivotally attached to the base plate 12 by the same pin 17 which joins with the arm 15. As thus far described, axial reciprocal movement of the rod 39 and its connecting arms 45, 15 and 9 causes the segments 13 and 14 to collapse or expand. In collapsing, the segments 13 and 14 move toward the axis of the drum in an arcuate path, the arc extending longitudinally of the drum.

The segments 18 and 19 are also collapsible by means of the reciprocal movement of the rod 39. However, there is a delayed action in the collapsing of these segments by means of an indirect connection with the rod 39. Slidably mounted on the rod 39 and interposed between the hub 7 and the block 43 is a slide block 47. A secondary link 48 is pivotally attached to the slide block 47 by means of a pin 49. The opposite end of the secondary link 48 pivotally joins with the arm 22 by means of an attaching pin 50. Therefore, movement of the block 43 in an axial outward direction away from the cylinder 40 results in collapsing of the segments 13 and 14 whereas axial outward movement of the slide block 47 results in collapsing of the segments 18 and 19. A spring 51 interposed between the block 43 and the slide block 47 ordinarily prevents collapsing of the segments 18 and 19 in a manner which will be described more fully below even though the segments 13 and 14 commence to collapse due to the direct linkage with the reciprocal rod 39.

As shown in Figure 3, a tire carcass 52 is built upon the drum 1 and bead portions 53 of the tire 52 extend radially inward around the edges of the segments of the building drum. Because of this condition, it is necessary that the alternating segments such as 14 and 19 move simultaneously in the direction of the axis of the drum at the beginning of the collapsing cycle. When the segment 14, for example, begins its collapsing movement, it moves partly in a direction longitudinally of the axis of the drum. The fact that the bead portions 53 engage with one of the drum segments results in the tire itself tending to force the segments such as 19 in the same longitudinal movement as the segment 14. However, instead of depending upon the tire to force the segments 19 to move longitudinally, we provide a spring 54 retained in the slide block 47 which presses against a plunger 55 engaging the end of the hub 7. This spring 54, therefore, assists in forcing the segments 19 to move longitudinally with the segments 14 for a short distance in order to relieve the tire bead portions 53 from the burden of moving the segments 19. There are a plurality of similar springs 54 disposed around the slide block 47. Actually there are four such springs 54. The combined compression of the springs 54 is greater than the compression of the spring 51. The length of the plunger 55 determines the extent of movement of the slide block 47 as caused by the spring 54. This movement is sufficient to disengage the segments 18 and 19 with the bead portions 53 of the tire 52.

The cylinder 40 operates to move the rod 39 at a uniform rate. Since the segments 13 and 14 are directly linked with the rod 39, the segments 13 and 14 continue to move until they are completely collapsed as shown in Figure 5. During the early stages of the collapsing operation, the segments 18 and 19 move along with the segments 13 and 14 by reason of the springs 54 which actuate the segments 18 and 19 for a distance equal to the length of the plunger 55. This amount of movement is sufficient to clear the bead portions 53 of the tire. At this cycle of the operation, the segments 18 and 19 remain stationary while the segments 13 and 14 continue to collapse.

When the segments 13 and 14 are sufficiently withdrawn to permit the segments 18 and 19 to collapse in overlapping relation with the segments 13 and 14, then the segments 18 and 19 continue their collapsing cycle. This is accomplished by means of a collar 56 located within the hub 7, and attached to the rod 39. The collar 56 strikes the end of a sleeve 57 extending from the slide block 47 into the interior of the hub 7, thereby moving the slide block 47 along with the rod 39. The link 48 being attached to the slide block 47 and being connected to the arm 22 causes the segments 18 and 19 to collapse in a positive action. The completely collapsed drum is shown in particular in Figures 4 and 5. When the drum reaches this position, the tire 52 is removed from the drum.

In the expanding cycle of the building drum operation, the fluid cylinder 40 is actuated so as to retract the rod 39. This carries with it the block 43 which, in turn, connects with the arm or link 45 and consequently expands the segments 13 and 14 in a uniform movement. In this operation, the spring 51 moves the slide block 47 causing the segments 18 and 19 to begin their expansion movement. However, the slide block is resisted in its longitudinal movement by means of the plungers 55 which engage the end of the hub 7, thus holding the slide block from further longitudinal movement against the action of the spring 51. At about this period of the operation of the drum, the block 43 engages a sleeve 47a on the slide block 47 so that all of the segments of the drum are moved in a positive action to their normal outward expanded position. When in its expanded position, fluid is retained in the cylinder 40 which operates to lock all of the segments in their first expanded position, and the drum is in position to receive the components of another tire to be built thereon after which the drum is collapsed and expanded in a similar cycle of operation.

Having thus described our invention, what we claim and desire to protect by Letters Patent is:

1. A tire building drum comprising a hub, a first set of arcuate segments, and a second set of arcuate segments alternately placed with respect to said first segments, said two sets of segments describing a contiguous circle, means for collapsing said drum including an axially movable actuating means mounted at said hub, pivotal linkages connecting the first set of segments to said actuating means for moving said first segments axially and radially toward said hub, a member mounted at said hub axially slidable with respect to said actuating means, pivotal linkages connecting the said alternately placed second set of segments only to said slidable member, means for moving said slidable member a definite distance to simultaneously move said second segments axially during the initial period of collapse, means for arresting axial movement of said second segments while the first segments continue axial and radial collapsing movement, and means for subsequently drawing said second segments radially over the first segments to complete collapse of the drum.

2. A tire building drum comprising, a plurality of spaced arcuate segments including a first set of segments and a second set of segments alternately placed with respect to said first segments, all of said segments collectively describing a contiguous circle, a hollow shaft, arms pivotally attached to the hollow shaft and to the segments, a rod extending through the hollow shaft, links pivotally connected to the rod and to the alternate segments only, secondary links pivotally associated with said rod and pivotally connected to an intermediate portion of arms only of segments between said alternate segments, means for moving said rod axially of the hollow shaft, means for moving said secondary links only during an initial portion of the movement of said rod to move all the segments simultaneously in a collapsing movement, means for thereafter arresting the movement of said secondary links while movement of said rod continues to halt the movement of said segments between said alternate segments while said alternate segments continue their collapsing movement, and means for thereafter resuming the motion of said secondary links toward a latter portion of the movement of said rod whereby said segments collapse in alternate overlapping relation to reduce the effective diameter of the drum.

3. A tire building drum comprising, a plurality of spaced arcuate segments including a first set of segments and a second set of segments alternately placed with respect to said first segments, all of said segments collectively describing a contiguous circle, a hollow shaft, arms pivotally attached to the hollow shaft and to the segments, a rod extending through the hollow shaft, links pivotally connected to the rod and to the alternate segments only, a block slidable on said rod, secondary links pivotally associated with the block and pivotally connected to an intermediate portion of arms only of segments between said alternate segments, means for moving said rod axially of the hollow shaft to collapse said alternate segments and means for moving said block only during initial and latter portions of the movement of said rod, whereby said segments collapse simultaneously initially and thereafter in alternate overlapping relation to reduce the effective diameter of the drum.

4. A tire building drum comprising, a plurality of spaced arcuate segments including a first set of segments and a second set of segments alternately placed with respect to said first segments, all of said segments collectively describing a contiguous circle, a hollow shaft, arms pivotally attached to the hollow shaft and to the segments, a sliding collapsing rod extending through the hollow shaft, links pivotally connected to the rod and only to the alternate segments, a block slidable on said sliding rod, secondary links pivotally associated with the block and pivotally connected to an intermediate portion of arms only of segments between said alternate segments, means for moving said sliding rod axially of the hollow shaft, and resilient means interposed between the block and the shaft for moving the block with the rod during only an initial period of collapsing movement of said rod, whereby said segments collapse in alternate overlapping relation to reduce the effective diameter of the drum.

5. A tire building drum comprising, a plurality of spaced arcuate segments including a first set of segments and a second set of segments alternately placed with respect to said first segments, all of said segments collectively describing a contiguous circle, a hollow shaft, arms pivotally attached to the hollow shaft and to the segments, a sliding collapsing rod extending through the hollow shaft, links pivotally connected to the rod and only to the alternate segments, a block slidable on said sliding rod, secondary links pivotally associated with the block and pivotally connected to an intermediate portion of arms of segments between said alternate segments, means for moving said rod axially of the hollow shaft, resilient means interposed between the block and the shaft for moving the block with the rod during only an initial period of collapsing movement of said rod, and positive means associated with the rod for engaging the block toward a latter period of movement of said rod, whereby said segments collapse in alternate overlapping relation to reduce the effective diameter of the drum.

6. A tire building drum comprising, a plurality of spaced arcuate segments including a first set of segments and a second set of segments alternately placed with respect to said first segments, all of said segments collectively describing a contiguous circle, a hollow shaft, arms pivotally attached to the hollow shaft and to the segments, a rod extending through the hollow shaft, links pivotally connected to the rod and only to the alternate segments, a block slidable on said rod, secondary links pivotally associated with the block and pivotally connected to an intermediate portion of arms of segments between said alternate segments, means for moving said rod axially of the hollow shaft, a compression spring interposed between the block and the shaft for moving the block with the rod during only an initial period of collapsing movement of said rod, and positive means associated with the rod for engaging the block toward a latter period of movement of said rod, whereby said segments collapse in alternate overlapping relation to reduce the effective diameter of the drum.

7. A tire building drum comprising, a plurality of spaced arcuate segments including a first set of segments and a second set of segments alternately placed with respect to said first segments, all of said segments collectively describing a contiguous circle, a hollow shaft, arms pivotally attached to the hollow shaft and to the segments, a rod extending through the hollow shaft, links pivotally connected to the rod and only to the alternate segments, a block slidable on said rod, secondary links pivotally associated with the block and pivotally connected to an intermediate portion of arms of segments between said alternate segments, means for moving said rod axially of the hollow shaft to collapse the segments, a compression spring acting between the hollow shaft and said block for moving the block with the rod during an initial period of collapse, and a second compression spring acting between the block and the rod to subsequently delay the movement of the block and associated segments between said alternate segments, whereby said segments collapse in alternate overlapping relation to reduce the effective diameter of the drum.

8. A tire building drum comprising, a plurality of spaced arcuate segments including a first set of segments and a second set of segments alternately placed with respect to said first segments, all of said segments collectively describing a contiguous circle, a hollow shaft, arms pivotally attached to the hollow shaft and to the segments, a rod extending through the hollow shaft, links pivotally connected to the rod and only to the alternate segments, a block slidable on said rod, secondary links pivotally associated with the block and pivotally connected to an intermediate portion of arms of segments between said alternate segments, means for moving said rod axially of the hollow shaft to collapse the segments, a compression spring acting between the hollow shaft and said block for moving the block in the same direction as the rod during an initial period of collapse, a second spring acting between the block and the rod to subsequently delay the movement of the block and associated segments between said alternate segments, said first named compression spring having greater compressive force than said second compression spring, and a collar fixed to said rod for engaging the block toward the end of the collapsing movement to resume the collapsing motion of said block and associated segments, whereby said segments collapse in alternate overlapping relation to reduce the effective diameter of the drum.

9. A collapsible tire building drum comprising in combination a first set of arcuate segments and a second set of alternately disposed arcuate segments constituting the periphery of the drum, an axial hub shaft at the center of the drum, an actuating rod extending axially of the shaft, pivotal linkages extending from the first segments to the actuating rod and to the hub shaft for moving the first segments axially and radially toward the center of the drum when the rod is moved axially to collapse the drum, an axially slidable member mounted at the center of the drum, further spaced pivotal linkages extending from the second segments to said sliding member and to the hub shaft for collapsing the second segments, a compression spring disposed between the actuating rod and the sliding member for yieldingly urging the sliding member axially of the hub shaft in a direction opposite to the collapsing direction of the actuating rod, a second spring disposed between the sliding member and the hub shaft for moving the sliding member a definite distance in the direction of the collapsing movement of the actuating rod to move the second segments simultaneously with the first segments during an initial period of a collapsing movement of the drum, a fixed projection on the actuating rod spaced from the sliding member when the drum is in the expanded condition, said fixed projection contacting said sliding member and moving same with the actuating rod only during a latter portion of the collapsing movement to complete collapse of the second segments in overlapping relation with the first segments.

DONALD E. ERICSON.
ERNEST E. KWIERANT.

REFERENCES CITED

The following references are of record in the file of this patent:

UNITED STATES PATENTS

| Number | Name | Date |
|---|---|---|
| 142,746 | Smith | Sept. 9, 1873 |
| 917,636 | Merillat | Apr. 6, 1909 |
| 956,125 | Merillat | Apr. 26, 1910 |
| 1,434,567 | Smith et al. | Nov. 7, 1922 |
| 2,339,543 | Bishop | Jan. 18, 1944 |
| 2,514,215 | Stevens et al. | July 4, 1950 |